Figure 1:
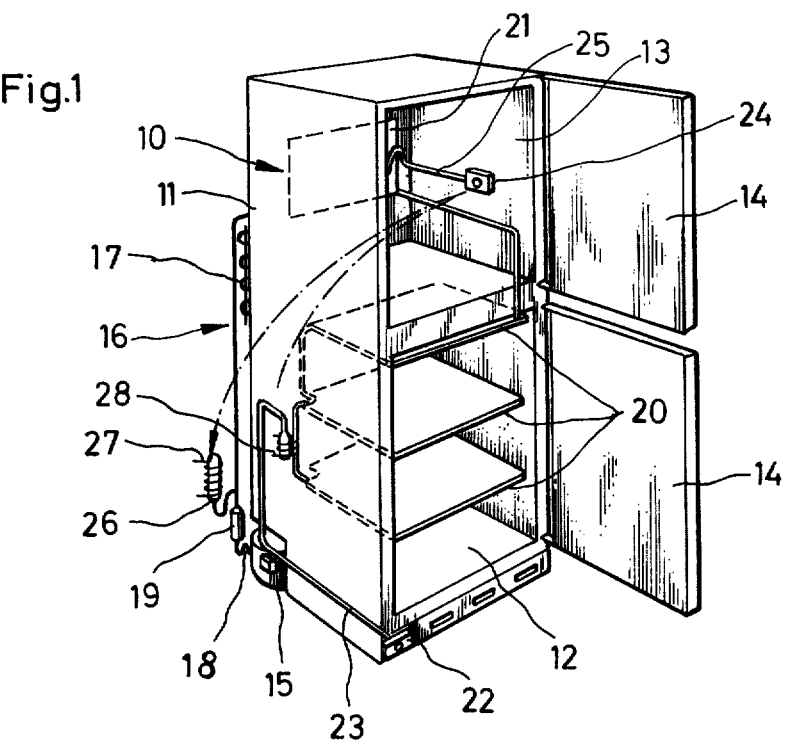

United States Patent [19]

Ballarin

[11] 4,033,739
[45] July 5, 1977

[54] REFRIGERATION UNIT

[75] Inventor: Jürgen Ballarin, Giengen, Germany

[73] Assignee: Bosch-Siemens Hausgerate GmbH, Stuttgart, Germany

[22] Filed: Feb. 6, 1976

[21] Appl. No.: 655,695

[30] Foreign Application Priority Data

Feb. 22, 1975 Germany .................... 2507706

[52] U.S. Cl. .................. 62/202; 62/213; 62/526
[51] Int. Cl.² ...................... G05D 23/30
[58] Field of Search ............ 62/202, 208, 213, 526

[56] References Cited

UNITED STATES PATENTS

| | | | |
|---|---|---|---|
| 2,640,327 | 6/1953 | Alsing ................................ | 62/202 |
| 3,105,364 | 10/1963 | O'Connell ......................... | 62/202 |
| 3,508,605 | 4/1970 | Zenji-Kusuda et al. ............ | 62/208 |
| 3,950,961 | 4/1976 | Lotz ................................... | 62/526 |

*Primary Examiner*—William E. Wayner
*Attorney, Agent, or Firm*—Herbert L. Lerner

[57] ABSTRACT

A dual temperature refrigerator driven by a single compressor, having a refrigeration cycle provided with a condenser, a refrigerant metering device and refrigerant transfer lines with at least two evaporator sections connected in series with the first in a colder compartment and the second in a warmer compartment. Two separate, intermittantly activated control elements; one associated with the warmer compartment turns on a heater of a refrigerant collector causing refrigerant to discharge therefrom, and thereby to fill the evaporator of the warmer compartment, the second control element associated with the colder compartment is activated by a sensor in the colder compartment and in turn activates the compressor. The first control element indirectly activates the compressor by means of a second heating element which heats the sensor which in turn activates the second control element which in turn activates the compressor. As a result there is time delay which permits equalization of the pressure in the refrigeration machine before starting up the compressor.

5 Claims, 3 Drawing Figures

U.S. Patent

July 5, 1977

4,033,739

REFRIGERATION UNIT

This invention relates to a refrigeration unit and more particularly refers to a new and improved dual temperature refrigerator. A dual temperature refrigerator has a refrigeration machine driven by a single compressor, having a refrigeration cycle provided with a condenser, a refrigerant metering device, and refrigerant transfer lines with at least two evaporator sections which are disposed in series in the flow path of the refrigerant and of which evaporator sections the first is associated with a colder compartment, i.e. deep freeze compartment, and the second with a warmer compartment, i.e. regular cooling compartment. Two separate, intermittently activated, control elements, of which, depending on the temperature in the respective compartment, the control element associated with the warmer compartment switches the current of a heating element of a refrigerant collector which is attached to the coolant circuit before the metering capillary. When the heating element is switched on, liquid refrigerant is discharged from the refrigerant collector, filling the second evaporator section.

In known refrigerator units of this type, it is conventional to switch the circuit of the compressor directly either by one control element in the regular compartment or the other control element in the deep freeze compartment which control elements are independent of each other. However, the danger thereby arises that the compressor may be turned on by one of the two control elements immediately after it has finished a cycle started by the other control element and before the pressure in the refrigeration machine is equalized. Even if the conditions for a start of the compressor under heavy load should infrequently occur, this still results in the motor protection relay being triggered, which is not permissible.

It is therefore necessary to provide such refrigerator units with a compressor motor especially designed for heavy load starting or to include in the electric circuit of the compressor a time-delay, relay, so that by the delay of same, the circuit of the compressor can be closed only after pressure equalization in the refrigeration machine has occurred.

It has been suggested to replace such a time delay relay by a bimetal switch which is heated during the running period of the compressor motor by the regulating element of the deep freeze compartment and whose contacts are in the circuit which is regulated by the control element of the regular cooling compartment. After completion of a running period which is controlled by the control element of the deep freeze compartment, these contacts stay open due to the inertia of the bimetal unit until pressure equalization in the refrigeration machine has taken place.

These suggestions are unsatisfactory because they are complicated and increase the manufacturing costs of such refrigeration units.

An object of the present invention is to provide a refrigerator unit with control of the compressor circuit arranged in a refrigerator in such a manner that starting of the compressor under heavy loading conditions is reliably avoided and without using expensive and unreliable switching elements for this purpose.

In accordance with the present invention there is provided a refrigeration unit, particularly a dual temperature refrigerator, with a refrigeration machine driven by a single compressor energized by an electric current flowing through an electric circuit, having a refrigeration cycle with coolant flowing in a coolant circuit through a condenser, a refrigerant metering capillary device and refrigerant transfer lines with at least two evaporator sections disposed in series in the flow path of the refrigerant, the first of said two evaporator sections associated with a colder compartment and the second of said two evaporator sections associated with a warmer compartment, two separate, intermittently activated, control elements, one of said control elements associated with the warmer compartment depending on the temperature therein, switches the current of a first heating element of a refrigerant collector attached to said coolant circuit before said metering capillary and from which latter liquid refrigerant is discharged when said heating element is switched on, thereby filling said second evaporator section, said second control element associated with said colder compartment being disposed in said electric circuit of said compressor, a sensor in said colder compartment for activating said second control element, a second heating element adjacent said sensor for heating said sensor, said second heating element being connected in series with said first control element whereby said first control element indirectly activates said compressor by means of said second heating element which heats said sensor which in turn triggers switching of said second control element and activation of said compressor. Thus the control element which is associated with the warmer compartment switches the compressor circuit indirectly through the control element associated with the colder compartment, wherein a heating resistor or element which is disposed in the circuit of the control element of the warmer compartment heats the sensor of the control element in the colder compartment and thereby triggers the switching of this control element. The heat output of the heating resistor is such that the switch on signal which is given by the control element of the warmer compartment is delayed by the required heating-up time of the sensor of the control element associated with the colder compartment and this delay is greater than the time it takes for the pressure to equalize in the refrigeration machine.

The disadvantageous condition for starting under heavy load, not permissible for a standard compressor, is thereby avoided by simple means in accordance with the present invention through the heating resistor which is energized by the control element of the warmer compartment and thereby indirectly, through the control element of the colder compartment, switches on the compressor circuit, with however a resulting time delay before renewed energizing of the compressor.

In practical embodiments of the invention, the heating element which heats the sensor is arranged in the circuit either parallel or in series with the heating element for heating the collector.

A further advantageous feature of the invention results if a switch activated by a relay precedes the heating element which heats the sensor and the contacts of this switch open whenever the compressor circuit is closed. The use of a relay as additional switching element for operating the heating element is also of advantage, because in the case of a large heat output of the heating element in proportion to a large cooling output of the refrigeration machine, the current to the heating element is switched off by the relay. In this manner, there is avoided having the energizing heating element continue to oppose the effect of the refrigeration machine.

Other features which are considered as characteristic for the invention are set forth in the appended claims.

Although the invention is illustrated and described herein as embodied in refrigeration unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings in which:

FIG. 1. Is a simplified perspective view of a dual temperature refrigeration unit with a refrigeration machine driven by a single compressor and provided with two evaporator sections connected in series.

Figure 2:
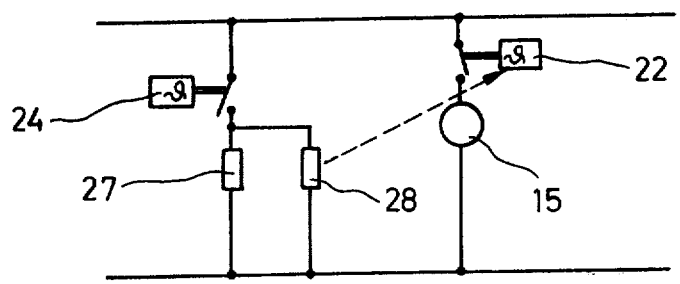

FIG. 2. Illustrates one embodiment of a switching control scheme of the compressor circuit which is switched or regulated by two control elements.

Figure 3:
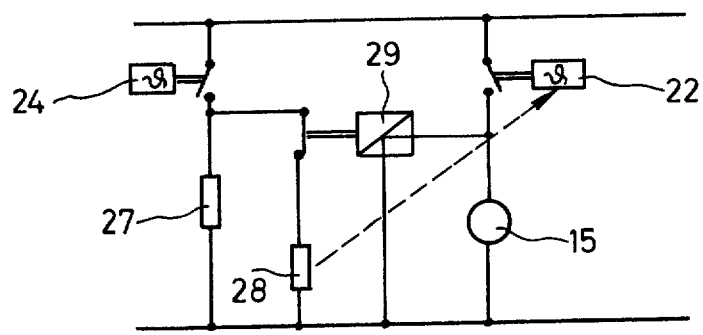

FIG. 3. is a second embodiment of a switching scheme in which a switch, activated by a relay, precedes the heating resistance for heating the sensor.

Referring to FIG. 1, a dual temperature-refrigeration unit 10 is provided with a heat insulated housing 11, in which a deep freeze compartment 12 and a regular cooling compartment 13 are disposed on top of each other. The deep freeze compartment 12 and also the regular cooling compartment 13 can be closed by separate heat insulated doors 14.

The dual temperature-refrigeration unit 10 is provided with refrigeration machine 16 which is driven or operated by a single compressor 15. In the coolant circuit of refrigeration unit 10 are arranged a condenser 17, a metering capillary 18, a drying cartridge 19, also several not-described connecting lines and two evaporator sections 20 and 21, connected in series. The first evaporator section 20 is associated with deep freeze compartment 12 and the second evaporator section 21 with regular cooling compartment 13.

Deep freeze compartment 12 is provided wih control element 22 which senses directly by sensing tube 23, the temperature of the first evaporator section 20 in compartment 12. For this purpose, the end of the sensing tube 23 is placed in good heat conducting contact with a connecting line in evaporator chamber 20. Regular cooling compartment 13, however, is regulated by control element 24 and sensing tube 25 senses the temperature in the second evaporator chamber 21.

A refrigeration machine 16 includes, within the refrigerant circuit, a refrigerant collector 26 disposed between the condenser 17 and metering capillary 18 and also before the drying cartridge 19. Refrigerant collector 26 is provided with a heating element 27 which is regulated by control element 24. Another heating element 28, as further explained in context with the switching schemes, is also regulated by control element 24 and serves to heat the end of first evaporator section 20 contacting sensing tube 23 of control element 22 which is associated with deep freeze compartment 12.

As shown in the switching control scheme of FIG. 2, the contacts of control element 22, associated with the deep freeze compartment 12, are in series with the compressor unit 15, so that control element 22 can directly switch the circuit, i.e. complete or break the circuit, of compressor unit 15. Control element 24, associated with the regular cooling compartment 13, is connected in parallel with the contacts of control element 22 and the contacts of control element 24 are also in series with the two heating elements 27 and 28 which are parallel to each other. In a variation of this embodiment, the two heating elements 27 and 28 are connected in series to each other and in series with the contacts of control element 24.

The switching control scheme of FIG. 3 differs from the described control scheme of FIG. 2, in that, in the circuit of heating resistor 28, which is parallel to heating resistor 27, are disposed the contacts of relay 29 which serve to open the circuit. This relay itself is connected in parallel to the drive motor of compressor unit 15 and energizes at the closing of the contacts of control element 22 which are in the circuit of the drive motor, whereby its contact open, which contacts are in series with heating element 28.

The above-described switching circuits operate as follows: When the temperature in freeze compartment 12 rises above the maximum value preset at control element 22, then this causes the contacts of control element 22 to close, whereby the drive motor of compressor unit 15 is started and the refrigeration machine begins to work. Due to the special design of the refrigeration machine which is provided with a heatable refrigerant collector 26, the refrigerant volume actively participating in the cooling process of the started refrigeration cycle initiated by control element 22 is only sufficient to fill the first evaporator section 20. Therefore, only the deep freeze compartment 12 is cooled by the control switch in this position.

When, during the hereby started cooling cycle, the temperature in freeze compartment 12 is lowered so far that the lower switching point of control element 22 is reached, then control element 22 is activated, whereby its contacts open and the drive motor of the compressor 15 is stopped.

However, if the temperature in the regular cooling compartment 13 rises above the upper predetermined switching point of its control element 24, the contacts of control element 24 close and thereby both heating elements 27 and 28 are supplied with electric current. The switching on or energizing of heating element 27 which is immediately adjacent to refrigerant collector 26 results in liquid refrigerant stored in collector 26 discharging into the coolant circuit and forced through first evaporator section 20 associated with the deep freeze compartment 12 into the second evaporator section, so that cooling is effected very quickly. In addition heating element 28 which is simultaneously energized with heating element 27 by contacts of the control element 24, heats the end of the sensing tube 23 of control element 22 at an area close to first evaporator section 20. After a predetermined heating period of sufficient length, at the end of sensing tube 23, control element 22 associated with the deep freeze compartment, is caused to switch, whereby the circuit of the drive motor of the compressor 15 is closed and the refrigeration machine begins to work.

The temperature in the regular cooling compartment 13 drops thereafter until a predetermined lower switching point is reached which triggers control element 24. The contacts of control element 24 are opened and electric current is cut off from both heating elements 27 and 28. Now, the refrigerant collector 26 gets colder and fills again gradually with liquid coolant until the refrigerant volume in the second evaporator section 21 is completely evaporated. By simultaneous cooling of the end of sensing tube 23 adjacent to the first evaporator section 20, the reaching of the lower switching point of control element 22 is simulated, whereby its contacts open and the drive motor of the compressor is stopped.

In operation of the dual temperature refrigerator according to the described switching system, it may occur that the contacts of control element 24 in regular cooling compartment 13 close, while the cooling cycle started by control element 22 due to a temperature rise in the deep freeze compartment 12 still continues. This would mean that heating element 28 works in opposition to refrigeration machine 16. Relay 29 is provided as shown in the switching diagram of FIG. 3 to avoid energy losses resulting from such situations. The contacts of relay 29 which are in the circuit of heating element 28, are opened whenever relay 29 which is connected parallel to the drive motor of compressor 15, is energized by closing of the contacts of control element 22.

Heating element 28 is so dimensioned that a time delay occurs during heating of the end of sensing tube 23 of control element 22 which is positioned closely to the first evaporator section, during which delay time, the pressure in the refrigeration machine has reliably equalized and a start of compressor 15 under heavy load is avoided.

When employing relay 29, it is possible to use the heat energy given off by heating element 28 for defrosting of the first evaporator section 20 in the deep freeze compartment 12. However, in this case, it is necessary to change the position of heater element 28 which must have a relative high heat output, to a position in the first evaporator section 22, distant from the end of the sensing tube 23. In this cae the end of sensing tube 23 is indirectly heated by the heat conduction of evaporator section 20.

There are claimed:

1. A refrigeration unit, particularly a dual temperature refrigerator, with a refrigeration machine driven by a single compressor energized by an electric current flowing through an electric circuit, having a refrigeration cycle with coolant flowing in a coolant circuit through a condenser, a refrigerant metering capillary device and refrigerant transfer lines with at least two evaporator sections disposed in series in the flow path of the refrigerant, the first of said two evaporator sections associated with a colder compartment and the second of said two evaporator sections associated with a warmer compartment, two separate, intermittently activated, control elements, one of said control elements associated with the warmer compartment depending on the temperature therein, switches the current of a first heating element of a refrigerant collector attached to said coolant circuit before said metering capillary and from which latter liquid refrigerant is discharged when said heating element is switched on, thereby filling said second evaporator section, said second control element associated with said colder compartment being disposed in said electric circuit of said compressor, a sensor in said colder compartment for activating said second control element, a second heating element adjacent said sensor for heating said sensor, said second heating element being connected in series with said first control element whereby said first control element indirectly activates said compressor by means of said second heating element which heats said sensor which in turn triggers switching of said second control element and activation of said compressor.

2. Refrigeration unit according to claim 1 wherein said second heating element has a regulated heat output such that the switch on signal of said first control element of said warmer compartment is delayed by the time required to heat-up said sensor of said control element associated with said colder compartment, said time of heat-up being greater than the time in which the pressure in said refrigeration machine equalizes.

3. Refrigeration unit according to claim 1 wherein said first heating element which heats said refrigerant collector is connected in parallel with said second heating element which heats said sensor.

4. Refrigeration unit according to claim 1 or wherein said first heating element which serves to heat said refrigerant collector is connected in series with said second heating element which heats said sensor.

5. Refrigeration unit according to claim 1 wherein a switch activated by a relay is connected before said second heating element which heats said sensor and the contacts of said switch open when the circuit of said compressor unit is closed.

* * * * *